United States Patent
Yoo (10) Patent No.: US 9,729,097 B2
(45) Date of Patent: Aug. 8, 2017

(54) APPARATUS FOR CONTROLLING INDUCTION MACHINE

(71) Applicant: LSIS CO., LTD., Anyang-si, Gyeonggi-do (KR)

(72) Inventor: Anno Yoo, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 49 days.

(21) Appl. No.: 14/691,418

(22) Filed: Apr. 20, 2015

(65) Prior Publication Data
US 2015/0326162 A1    Nov. 12, 2015

(30) Foreign Application Priority Data
May 12, 2014    (KR) .......... 10-2014-0056588

(51) Int. Cl.
| | |
|---|---|
| H02P 27/04 | (2016.01) |
| H02P 21/00 | (2016.01) |
| H02P 21/14 | (2016.01) |
| H02P 21/04 | (2006.01) |
| H02P 21/22 | (2016.01) |
| H02P 21/16 | (2016.01) |
| H02P 21/18 | (2016.01) |

(52) U.S. Cl.
CPC .......... *H02P 21/0035* (2013.01); *H02P 21/04* (2013.01); *H02P 21/14* (2013.01); *H02P 21/141* (2013.01); *H02P 21/22* (2016.02); *H02P 21/16* (2016.02); *H02P 21/18* (2016.02)

(58) Field of Classification Search
CPC ........ H02P 21/141; H02P 21/14; H02P 21/04; H02P 21/22; H02P 21/0035; H02P 21/18; H02P 21/16; H02P 21/06; B60L 2240/429

USPC ............................................ 318/400.02, 801
See application file for complete search history.

(56) References Cited

U.S. PATENT DOCUMENTS

| | | | |
|---|---|---|---|
| 6,707,270 B2 | 3/2004 | Chen et al. | |
| 6,831,440 B1* | 12/2004 | Royak .................. | H02P 21/141 318/727 |
| 2003/0090226 A1 | 5/2003 | Chen et al. | |
| 2013/0009575 A1* | 1/2013 | Yoo ........................ | H02P 21/06 318/400.02 |

(Continued)

FOREIGN PATENT DOCUMENTS

| | | |
|---|---|---|
| CN | 101133547 | 2/2008 |
| CN | 101316093 | 12/2008 |
| CN | 102868339 | 1/2013 |

(Continued)

OTHER PUBLICATIONS

European Patent Office Application Serial No. 15164601.5, Search Report dated Feb. 8, 2016, 11 pages.

(Continued)

*Primary Examiner* — Bentsu Ro
*Assistant Examiner* — Zemenay Truneh
(74) *Attorney, Agent, or Firm* — Lee, Hong, Degerman, Kang & Waimey PC (57) ABSTRACT

An apparatus for controlling an induction motor is provided, the apparatus generates generating a d-axis current command and a q-axis current command of a torque command, estimating speed of a rotor of the motor, and correcting the d-axis and q-axis current commands by using the estimated speed, to enhances the rotor speed and position estimation performance by increasing the slip frequency.

7 Claims, 3 Drawing Sheets

(56) References Cited

U.S. PATENT DOCUMENTS

2013/0175955 A1* 7/2013 Son .................. H02P 21/14
                                                318/400.02

FOREIGN PATENT DOCUMENTS

| | | |
|---|---|---|
| CN | 103199789 | 7/2013 |
| EP | 0117514 | 9/1984 |
| EP | 1049245 | 11/2000 |
| JP | 2005278327 | 10/2005 |
| JP | 2011-067066 | 3/2011 |
| JP | 2011067066 | 3/2011 |
| KR | 20110042370 | 4/2011 |
| KR | 10-2012-0067847 | 6/2012 |
| KR | 20140030811 | 3/2014 |

OTHER PUBLICATIONS

Korean Intellectual Property Office Application Serial No. 10-2014-0056588, Office Action dated Jan. 19, 2015, 4 pages.

* cited by examiner

APPARATUS FOR CONTROLLING INDUCTION MACHINE

CROSS-REFERENCE TO RELATED APPLICATIONS

Pursuant to 35 U.S.C. §119(a), this application claims the benefit of earlier filing date and right of priority to Korean Patent Application No(s). 10-2014-0056588, filed on May 12, 2014, the contents of which are all hereby incorporated by reference herein in its entirety.

BACKGROUND

Field of the Disclosure

The present disclosure relates to an apparatus for controlling an induction machine.

Discussion of the Related Art

In general, rotor position sensors such as an encoder and a resolver are useful for enhancing performance of a motor driving. However, these position sensors have disadvantages of being vulnerable to a vibration and increasing cost for the total system. Therefore, needs for the techniques for driving a motor without a position sensor are increasing, due to these problems.

The motor driving methods without a position sensor (sensorless) are mainly used in HVAC (Heating, Ventilation, Air-Condition) loads such as fans, pumps, and compressors, or up and down loads such as elevators and cranes, for the purpose of speed control.

In addition, the sensorless driving methods of an induction motor are mainly used for the purpose of torque control for the devices such as conveyors.

However, in a general sensorless torque control method, it is known that the driving performance in a low speed and low torque area is declined compared to the driving performance in a speed control method.

SUMMARY OF THE DISCLOSURE

The technical challenge which the present disclosure intends to achieve is, to provide an apparatus for controlling an induction machine which increases the slip frequency of an induction motor and thereby enhances the magnetic flux estimation performance, by changing the size of magnetic flux current adjustable to the driving status of the induction motor.

In a general aspect of the present disclosure, there is provided an apparatus for controlling a motor, the apparatus comprising: a generator configured to generate a d-axis current command and a q-axis current command of a synchronous reference frame; a current controller configured to output a d-axis voltage and a q-axis voltage of the synchronous reference frame, by performing a proportional and integral control, from the d-axis current command and the q-axis current command of the synchronous reference frame; a first conversion unit configured to convert the d-axis voltage and the q-axis voltage of the synchronous reference frame received from the current controller, to a d-axis voltage and a q-axis voltage of a stationary reference frame; an inverter configured to output a voltage to control a motor, from the d-axis voltage and the q-axis voltage of the stationary reference frame received from the first conversion unit; a second conversion unit configured to convert a phase current outputted from the inverter to a d-axis current and a q-axis current of the synchronous reference frame; an estimation unit configured to estimate a speed and a position of a rotor of the motor, based on the phase current outputted from the inverter, and based on the d-axis voltage and the q-axis voltage of the stationary reference frame outputted from the first conversion unit; and a correction unit configured to correct the d-axis current command and the q-axis current command of the synchronous reference frame received from the generator and to provide the corrected the d-axis and q-axis current commands for the current controller, by using the d-axis current command and the q-axis current command of the synchronous reference frame received from the generator and the speed of the rotor received from the estimator.

In some exemplary embodiment of the present disclosure, the correction unit may decrease the d-axis current command of the synchronous reference frame received from the generator, increases a slip frequency in response to the decreased d-axis current command of the synchronous reference frame, and accelerates a rotor magnetic flux angle in response to the increased slip frequency.

In some exemplary embodiment of the present disclosure, the correction unit may include: a determination unit configured to determine a constant K to be applied to the d-axis current command of the synchronous reference frame; a first calculation unit configured to multiply the d-axis current command of the synchronous reference frame received from the generator by the constant K; and a second calculation unit configured to multiply the q-axis current command of the synchronous reference frame received from the generator by an inverse number of the constant K.

In some exemplary embodiment of the present disclosure, the determination unit may determine the constant K in consideration of a current limiting condition, a voltage limiting condition, a slip frequency condition, and an excitation current condition.

In some exemplary embodiment of the present disclosure, the determination unit may determine the constant K so that the constant K is satisfied in a range of $\text{Max}(K_{min1}, K_{min2}, K_{min3}, K_{min4}) \mathrel{D} K \mathrel{D} \min(1, K_{max})$, where Max function may be a function to seek a maximum value, min function may be a function to seek a minimum value, and each of $K_{min1}$, $K_{min2}$, $K_{min3}$, $K_{min4}$, and $K_{max}$ may be determined to satisfy the current limiting condition, the slip frequency condition, the voltage limiting condition, the excitation current condition, and the slip frequency condition, respectively.

In some exemplary embodiment of the present disclosure, the $K_{min1}$ may be determined by the following equation:

$$K_{min1} = \sqrt{\frac{B - \sqrt{B^2 - 4AT_e^2}}{2A}},$$

where $A = K_t^2 i_{ds}^{*4}$, and $B = K_t^2 i_{ds}^{*2} I_{s\_rated}^2$.

In some exemplary embodiment of the present disclosure, the $K_{min2}$ may be determined by the following equation:

$$K_{min2} = \sqrt{\frac{T_e}{K_t i_{ds}^{*2} T_r W_{sl\_over}}}.$$

In some exemplary embodiment of the present disclosure, the $K_{min2}$ may be determined by the following equation:

$$K_{min3} = \sqrt{\frac{V_{max}^2 - \sqrt{V_{max}^4 - 4L_s^2\sigma L_s^2 \frac{T_e^2}{K_f^2}}}{2L_s^2 i_{dse}^2}}.$$

In some exemplary embodiment of the present disclosure, the $K_{min4}$ may be determined by the following equation:

$$K_{min4} E 0.2$$

In some exemplary embodiment of the present disclosure, the $K_{max}$ may be determined by the following equation:

$$K_{max} = \sqrt{\frac{V_{max}^2 + \sqrt{V_{max}^4 - 4L_s^2\sigma L_s^2 \frac{T_e^2}{K_f^2}}}{2L_s^2 i_{dse}^2}}.$$

According to an exemplary embodiment of the present disclosure, speed and position of the rotor may be stably estimated with respect to the same rotor speed, because the rotor speed and frequencies of voltage and current applied to the position estimation unit are increased, and the frequency of the rotor magnetic flux is accelerated, by increasing the slip frequency by decreasing the magnetic flux current.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein. Rather, the described aspect is intended to embrace all such alterations, modifications, variations, and equivalents that fall within the scope and novel idea of the present disclosure.

Hereinafter, referring to enclosed figures, a conventional sensorless torque control is described, and afterwards, an exemplary embodiment of the present disclosure will be described in detail.

Figure 1:
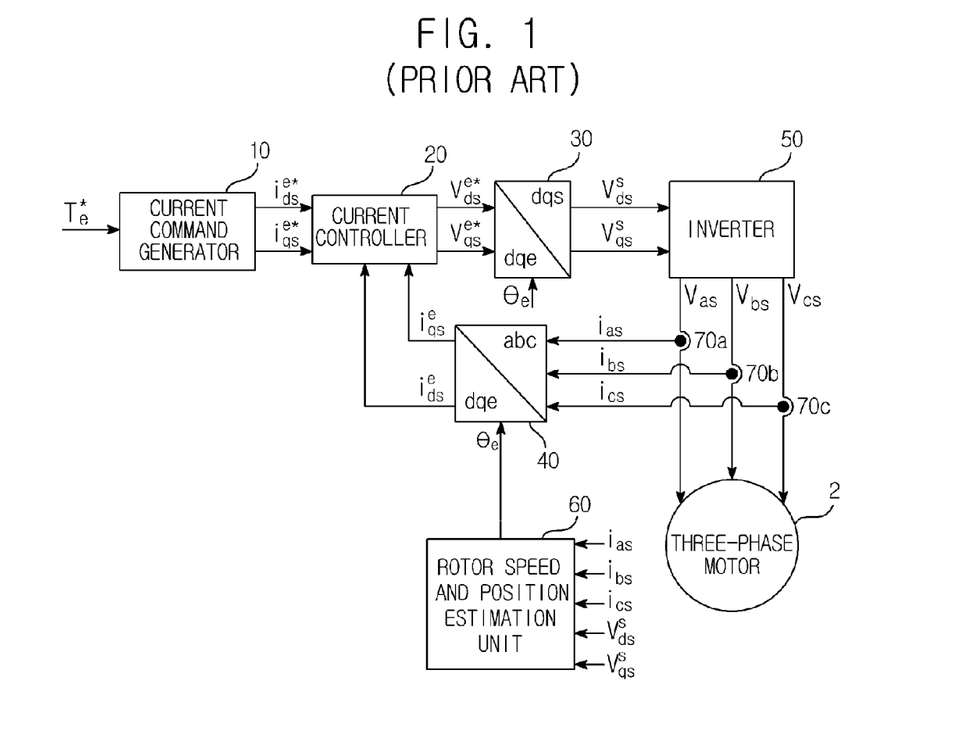
FIG. 1 is a block diagram illustrating an apparatus for sensorless torque control of a conventional induction motor.

FIG. 1 is a block diagram illustrating an apparatus for sensorless torque control of a conventional induction motor.

The current command generator (10) generates d-axis and q-axis current commands of the synchronous reference frame from the torque command. The current controller (20) is a proportional and integral current controller including a feed-forward. The current controller (20) outputs d-axis and q-axis voltages of the synchronous reference frame. The first coordinate conversion unit (30) converts the d-axis and q-axis voltage of the synchronous reference frame to the voltage of the stationary reference frame.

Meanwhile, the second coordinate conversion unit (40) converts the phase currents of the induction motor (2) measured by the current sensors (70a, 70b, 70c) to d-axis and q-axis currents of the synchronous reference frame. The inverter (50) applies a voltage to the induction motor (2).

In addition, the rotor speed and position estimation unit (60) estimates speed and position of a rotor of the three-phase induction motor (2), by receiving the phase currents of the induction motor (2) received from the current sensors (70) and the output voltage of the first coordinate conversion unit (30).

Hereinafter, a structure of the apparatus of FIG. 1 will be described in detail.

Figure 2:
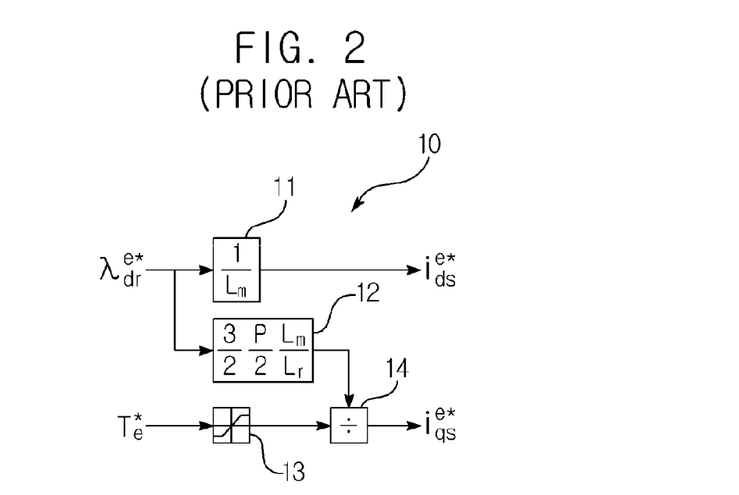
FIG. 2 is a detailed block diagram illustrating a current command generator of FIG. 1.

FIG. 2 is a detailed block diagram illustrating a current command generator (10) of FIG. 1. Unit 1 (11) determines a d-axis current command from the regular rotor magnetic flux. Here, Lm is a magnetizing inductance.

Unit 2 (12) performs a calculation in order to find the q-axis current command. Unit 3 (13) restricts the maximum value of the initial torque command. Unit 4 (14) outputs the q-axis current command from the relation of the torque command outputted by Unit 3 (13) and the regular rotor magnetic flux. Here, the torque of the induction motor is as in the following equation:

$$T_e = \frac{3}{2}\frac{P}{2}\frac{L_m}{L_r}\lambda_{dr}^e i_{qs}^e \qquad \text{[Equation 1]}$$

From the above Equation 1, the q-axis current command can be found as in the following equation:

$$i_{qs}^e = \frac{T_e}{\frac{3}{3}\frac{P}{2}\frac{L_m}{L_r}\lambda_{dr}^e} \qquad \text{[Equation 2]}$$

Figure 3A:
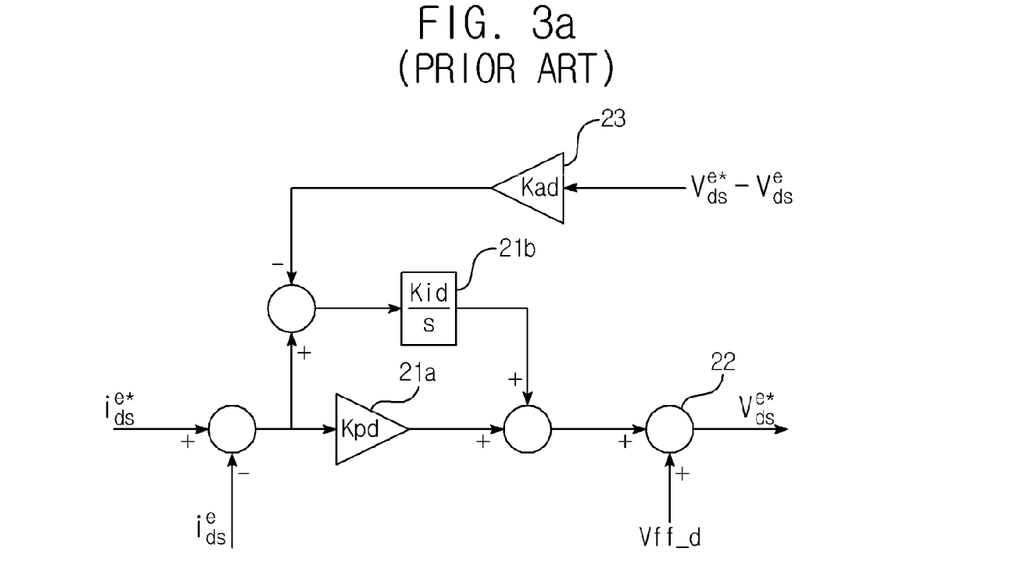
FIGS. 3a and 3b are detailed block diagrams illustrating a current controller of FIG. 1.
Figure 3B:
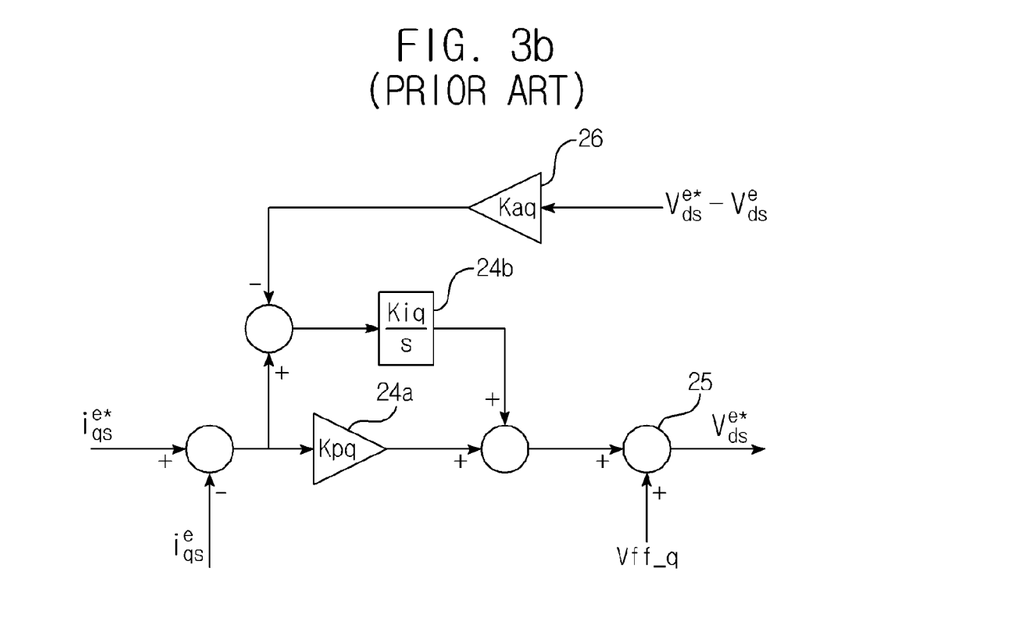

FIGS. 3a and 3b are detailed block diagrams illustrating a current controller (20) of FIG. 1. FIG. 3a is a block diagram of a d-axis current controller, and FIG. 3b is a block diagram of a q-axis current controller.

As illustrated in FIGS. 3a and 3b, the d-axis and q-axis current controllers are formed of a proportional and integral controller and a feed-forward, in order to respectively control each of the d-axis and q-axis current of the synchronous reference frame. Here, Unit 1 (21a), Unit 2 (21b), Unit 5 (24a), and Unit 6 (24b) provides a proportional and integral gain for current control, from the current command and feedback current, while Unit 3 (22) and Unit 7 (25) perform the feed-forward. The detailed structure may be variously formed by modeling of the induction motor (2).

In addition, Unit 4 (23) and Unit 8 (26) provides an anti-windup gain for preventing the divergence of Unit 2 (21b) and Unit 6 (24b), when output of the current controller (20) exceeds the voltage size which the inverter can composite.

The first coordinate conversion unit (30) of FIG. 1 converts the synchronous reference frame voltage to the stationary reference frame voltage according to the following equations:

$$V_{ds}^s = V_{ds}^{e*}\cos\theta_e - V_{qs}^{e*}\sin\theta_e \qquad \text{[Equation 3]}$$

$$V_{qs}^s = V_{ds}^{e*}\sin\theta_e + V_{qs}^{e*}\cos\theta_e \qquad \text{[Equation 4]}$$

The second coordinate conversion unit (40) converts the phase currents of the induction motor (2) measured by the current sensor (70a, 70b, 70c) to the d-axis and q-axis currents of the synchronous reference frame, according to the following equations:

$$i_{ds}^s = \frac{2i_{as} - i_{bs} - i_{cs}}{3}$$ [Equation 5]

$$i_{qs}^s = \frac{i_{bs} - i_{cs}}{\sqrt{3}}$$ [Equation 6]

$$i_{ds}^e = i_{ds}^s \cos\theta_e + i_{qs}^s \sin\theta_e$$ [Equation 7]

$$i_{qs}^e = -i_{ds}^s \sin\theta_e + i_{qs}^s \cos\theta_e$$ [Equation 8]

The rotor speed and position estimation unit (60) outputs the rotor speed and position by receiving the output current of the induction motor (2) and the output voltage of the inverter (50). The rotor speed and position estimation unit (60) may be formed by various methods.

In such the conventional apparatus for controlling torque of an induction motor, the torque current is fixed at a certain torque command, because the size of the magnetizing current is fixed. Thereby, the slip frequency is maintained to be lowered in the situation of the same rotor speed. Thus, estimation of rotor speed and magnetic flux angle becomes difficult, due to the declination of magnetic flux estimation performance which is essential for controlling the induction motor.

Therefore, according to an exemplary embodiment of the present disclosure, there is provided an apparatus for controlling an induction machine which increases the slip frequency of an induction motor and thereby enhances the magnetic flux estimation performance, by changing the size of magnetic flux current adjustable to the driving status of the induction motor.

Figure 4:
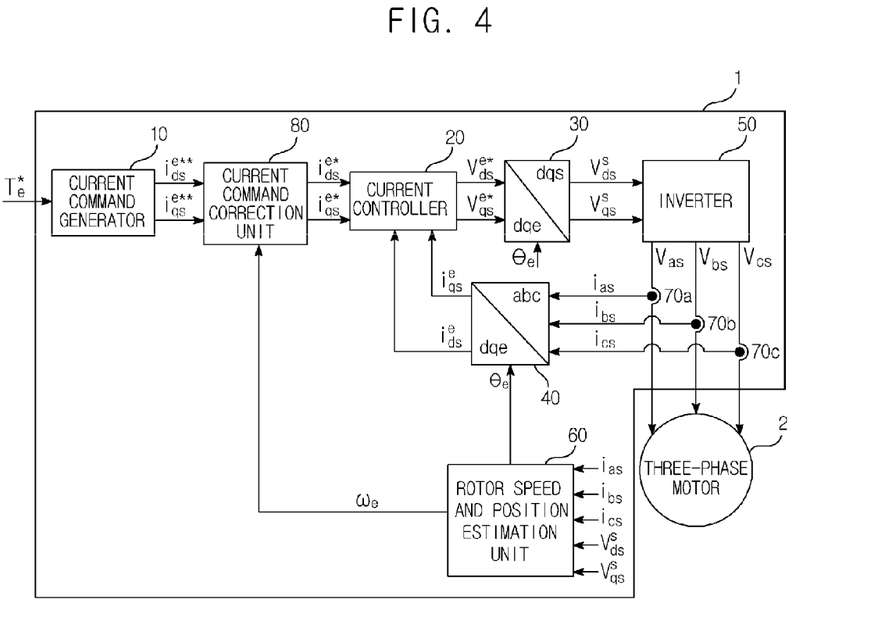
FIG. 4 is a block diagram illustrating a controller of an induction motor according to an exemplary embodiment of the present disclosure.

FIG. 4 is an exemplary embodiment block diagram illustrating a controller of an induction motor according to the present disclosure.

As illustrated in FIG. 4, the controlling apparatus (1) of the present disclosure may include a current command generator (10), a current command correction unit (80), a current controller (20), a first coordinate conversion unit (30), a second coordinate conversion unit (40), an inverter (50), a rotor speed and position estimation unit (60), and current sensors (70a, 70b, 70c), for controlling the induction motor (2).

The current command generator (10) may generate d-axis and q-axis current commands of the synchronous reference frame from the torque command. Detailed operation of the current command generator (10) is as previously described through FIG. 2. The current controller (20) may be a proportional and integral current controller including a feed-forward. The current controller (20) may output d-axis and q-axis voltages of the synchronous reference frame. Detailed operation of the current controller (20) is as previously described through FIGS. 3a and 3b.

The first coordinate conversion unit (30) may convert the d-axis and q-axis voltage of the synchronous reference frame to the voltage of the stationary reference frame.

In addition, the second coordinate conversion unit (40) may convert the phase currents of the induction motor (2) to d-axis and q-axis currents of the synchronous reference frame, by receiving the phase currents of the induction motor (2) from the current sensors (70a, 70b, 70c). The inverter (50) may output a voltage to control the induction motor (2), by using the d-axis voltage and the q-axis voltage of the stationary reference frame received from the first coordinate conversion unit (30).

The rotor speed and position estimation unit (60) may estimate the rotor speed and position of the induction motor (2), by receiving the phase currents of the induction motor (2) from the current sensors (70a, 70b, 70c), and by receiving d-axis voltage and the q-axis voltage of the stationary reference frame from the first coordinate conversion unit (30).

The current command correction unit (80) may correct the d-axis current command and the q-axis current command of the synchronous reference frame, by receiving the d-axis current command and the q-axis current command of the synchronous reference frame outputted from the current command generator (10), and by receiving the speed of the rotor received from the rotor speed and position estimation unit (60).

Hereinafter, the operation of the controlling apparatus (1) illustrated in FIG. 4 will be described. Because the operations of all elements except for the current command correction unit (80) are as previously described referring to FIGS. 1 to 3, the operation of the current command correction unit (80) will be mainly described.

At first, the torque equation of the induction motor (2) in a steady state is as in the following. Here, the d-axis current corresponds to the magnetic flux current, and the q-axis current corresponds to the torque current.

$$T_e = \frac{3}{2}\frac{P}{2}\frac{L_m^2}{L_r}i_{ds}^e i_{qs}^e$$ [Equation 9]

Here, $$\frac{3}{2}\frac{P}{2}\frac{L_m^2}{L_r}$$

is a constant. Thus, it is defined as:

$$\frac{3}{2}\frac{P}{2}\frac{L_m^2}{L_r} = K_t.$$

Meanwhile, the slip frequency of the induction motor (2) can be defined as in the following equation.

$$\omega_{sl} = \frac{1}{T_r}\frac{i_{qs}^e}{i_{ds}^e}$$ [Equation 10]

In addition, while driving the induction motor (2), the rotor magnetic flux angle can be defined as in the following equation.

$$\theta_e = \int \omega_r + \omega_{sl} dt,$$ [Equation 11]

where $\omega_r$ is electrical velocity of a rotor of the induction motor (2).

In the above Equation 9, when the d-axis current of the induction motor (2) is changed, the q-axis current is also changed in order to satisfy the torque command. Especially, when the d-axis current is decreased, size of the q-axis current is increased. Therefore, as a result, size of the slip frequency is increased by the relation of Equation 10, and the rotor magnetic flux angle changes faster in the same rotor speed by the relation of Equation 11.

The present disclosure is to stably control the induction motor (2) by reducing size of the d-axis current (magnetic flux current), by using such phenomenon as in the above. According to an exemplary embodiment of the present disclosure, the current command correction unit (80) may correct the d-axis and q-axis currents with the following four conditions.

1. Current limiting condition
2. Voltage limiting condition
3. Slip frequency condition
4. Excitation current condition At first, the current limiting condition may be expressed as in the following equation.

$$(i_{ds}^e)^2 + (i_{qs}^e)^2 \le I_{s\_rated}^2 \qquad \text{[Equation 12]}$$

When changing the d-axis current by multiplying by K (K is a real number such that $0 < K \le 1$), Equation 12 may be expressed as in the following equation.

$$(K i_{ds}^e)^2 + \left(\frac{T_e}{K_t K i_{ds}^e}\right)^2 \le I_{s\_rated}^2 \qquad \text{[Equation 13]}$$

Hereupon, a range of the constant K may be found as in the following equation.

$$K_{min1} < K \le 1, \qquad \text{[Equation 14]}$$

where $$K_{min1} = \sqrt{\frac{B - \sqrt{B^2 - 4AT_e^2}}{2A}},$$

$A = K_t^2 i_{ds}^{e4}$, and $B = K_t^2 i_{ds}^{e2} I_{s\_rated}^2.$

Next, the voltage limiting condition may be expressed as in the following.

$$V_{ds}^{e2} + V_{qs}^{e2} = V_{s,max}^2 \qquad \text{[Equation 15]}$$

The above Equation 15 may be approximated by the following equation.

$$\sigma L_s^2 \frac{T_e^2}{K_t^2 i_{no\_load}^2} \frac{1}{K^2} + L_s^2 K^2 i_{no\_load}^2 \le V_{max}^2 \qquad \text{[Equation 16]}$$

From the above Equation 16, the following conditions can be set.

$$K_{max} = \sqrt{\frac{V_{max}^2 + \sqrt{V_{max}^4 - 4L_s^2 \sigma L_s^2 \frac{T_e^2}{K_t^2}}}{2L_s^2 i_{dse}^2}} \qquad \text{[Equation 17]}$$

$$K_{min3} = \sqrt{\frac{V_{max}^2 - \sqrt{V_{max}^4 - 4L_s^2 \sigma L_s^2 \frac{T_e^2}{K_t^2}}}{2L_s^2 i_{dse}^2}} \qquad \text{[Equation 18]}$$

Next, the slip frequency condition may be expressed as in the following.

From Equation 10, the slip frequency condition may be expressed as in the following equation.

$$W_{sl\_cal} = \frac{1}{T_r} \frac{1}{K i_{ds}^e} \frac{T_e}{K_t K i_{ds}^e} \le \frac{1}{T_r} \frac{i_{qs\_rated}}{i_{ds}^e} M = W_{sl\_over} \qquad \text{[Equation 19]}$$

The above Equation 19 means that the slip frequency with respect to a certain torque command is maintained as below M-fold of the regular slip frequency. Normally M satisfies the following condition.

$$0 < M \le 2 \qquad \text{[Equation 20]}$$

The above Equation 20 is to render the slip frequency of the induction motor (2) from the corrected current command being controlled below the two-fold of the regular slip frequency. The range of Equation 20 may be changed according to the type of the induction motor (2).

Hereupon, the following condition can be found.

$$K_{min2} = \sqrt{\frac{T_e}{K_t i_{ds}^{e2} T_r W_{sl\_over}}} \qquad \text{[Equation 21]}$$

For the last, the excitation current condition may be expressed as in the following.

The control of the induction motor (20) is normally destabilized when the excitation is sufficiently performed. Thus, the minimum excitation current can be set according to the type of the induction motor (2), as in the following.

$$K_{min4} \ge 0.2 \qquad \text{[Equation 22]}$$

In Equation 22, an example where the ratio of the minimum excitation current is set as 20% of the regular excitation current is described. However, the ratio may be changed according to the type of the induction motor (2).

The range of K can be found from Equations 14, 17, 18, and 22, as in the following.

$$\text{Max}(K_{min1}, K_{min2}, K_{min3}, K_{min4}) \le K \le \min(1, K_{max}) \qquad \text{[Equation 23]}$$

where Max function is a function to seek a maximum value, and min function is a function to seek a minimum value.

According to an exemplary embodiment of the present disclosure, the slip frequency may be maximized, by setting the value of K as the minimum value being satisfied in a range of Equation 23. Through this, the d-axis and q-axis current command of the synchronous reference frame maintaining a certain torque, can be modified as in the following equations.

$$i_{ds}^{e*} = K i_{ds}^{e**} \qquad \text{[Equation 24]}$$

$$i_{qs}^{e*} = \frac{1}{K} i_{qs}^{e**} \qquad \text{[Equation 25]}$$

Figure 5:
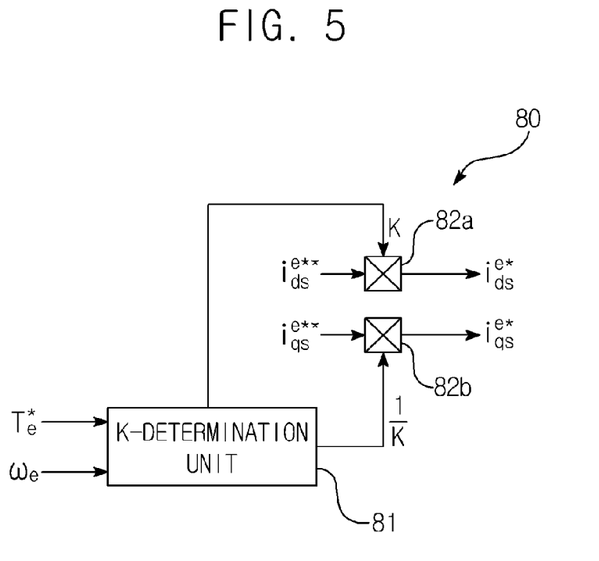
FIG. 5 is a block diagram illustrating a current command correction unit of FIG. 4 according to an exemplary embodiment of the present disclosure.

FIG. 5 is a detailed exemplary embodiment block diagram illustrating a current command correction unit (80) of FIG. 4.

As illustrated in FIG. 5, the current command correction unit (80) of the controlling apparatus (1) according to an exemplary embodiment the present disclosure may include a K-determination unit (81) and multiplication units (82a, 82b).

The K-determination unit (81) may determine K by Equation 23 determined according to the limiting conditions described in the above. The multiplication units (82a, 82b) may output corrected current commands as in the above Equations 24 and 25, by using the K.

Therefore, according to an exemplary embodiment of the present disclosure, when the slip frequency is increased, the frequency of the rotor magnetic flux angle is accelerated by the relation of Equation 11, and the frequencies of voltage and current applied to the rotor speed and position estimation unit (60) are increased. Thus, the speed and position of the rotor may be stably estimated with respect to the same rotor speed.

That is, according to an exemplary embodiment of the present disclosure, the performance of the induction motor may be enhanced, by maximizing the slip frequency at a certain torque command.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments. Therefore, the technical scope of the rights for the present disclosure shall be decided by the claims.

REFERENCE NUMERALS

- 10: current command generator
- 20: current controller
- 30, 40: coordinate conversion unit
- 50: inverter
- 60: rotator speed and position estimation unit
- 70a, 70b, 70c: current sensor
- 80: current command correction unit
- 2: induction motor

What is claimed is:

1. An apparatus for controlling a motor, the apparatus comprising:
    a generator configured to generate a d-axis current command and a q-axis current command of a synchronous reference frame;
    a current controller configured to output a d-axis voltage and a q-axis voltage of the synchronous reference frame, by performing a proportional and integral control, from the d-axis current command and the q-axis current command of the synchronous reference frame;
    a first conversion unit configured to convert the d-axis voltage and the q-axis voltage of the synchronous reference frame received from the current controller, to a d-axis voltage and a q-axis voltage of a stationary reference frame;
    an inverter configured to output a voltage to control a motor, from the d-axis voltage and the q-axis voltage of the stationary reference frame received from the first conversion unit;
    a second conversion unit configured to convert a phase current outputted from the inverter to a d-axis current and a q-axis current of the synchronous reference frame;
    an estimation unit configured to estimate a speed and a position of a rotor of the motor, based on the phase current outputted from the inverter, and based on the d-axis voltage and the q-axis voltage of the stationary reference frame outputted from the first conversion unit; and
    a correction unit configured to correct the d-axis current command and the q-axis current command of the synchronous reference frame received from the generator and to provide the corrected the d-axis and q-axis current commands for the current controller, by using the d-axis current command and the q-axis current command of the synchronous reference frame received from the generator and the speed of the rotor received from the estimator,
    wherein the correction unit decreases the d-axis current command of the synchronous reference frame received from the generator, increases a slip frequency in response to the decreased d-axis current command of the synchronous reference frame, and accelerates a rotor magnetic flux angle in response to the increased slip frequency,
    wherein the correction unit includes a determination unit configured to determine a constant K to be applied to the d-axis current command of the synchronous reference frame;
    a first calculation unit configured to multiply the d-axis current command of the synchronous reference frame received from the generator by the constant K; and
    a second calculation unit configured to multiply the q-axis current command of the synchronous reference frame received from the generator by an inverse number of the constant K, and
    wherein the determination unit determines the constant K so that the constant K is satisfied in a range of Max ($K_{min\ 1}$, $K_{min\ 2}$, $K_{min\ 3}$, $K_{min\ 4}$)≤K≤min (1, $K_{max}$),
    where Max function is a function to seek a maximum value, min function is a function to seek a minimum value, and each of $K_{min\ 1}$, $K_{min\ 2}$, $K_{min\ 3}$, $K_{min\ 4}$, and $K_{max}$ is determined to satisfy the current limiting condition, the slip frequency condition, the voltage limiting condition, the excitation current condition, and the slip frequency condition, respectively.

2. The apparatus of claim 1, wherein
the determination unit determines the constant K in consideration of a current limiting condition, a voltage limiting condition, a slip frequency condition, and an excitation current condition.

3. The apparatus of claim 1, wherein
the $K_{min\ 1}$ is determined by the following equation:

$$K_{min1} = \sqrt{\frac{B - \sqrt{B^2 - 4AT_e^2}}{2A}},$$

where $A = K_t^2 i_{ds}^{e4}$, and $B = K_t^2 i_{ds}^{e2} I_{s\_rated}^2$.

4. The apparatus of claim 1, wherein
the $K_{min\ 2}$ is determined by the following equation:

$$K_{min2} = \sqrt{\frac{T_e}{K_t i_{ds}^{e2} T_r W_{sl\_over}}}.$$

5. The apparatus of claim 1, wherein the $K_{min\ 2}$ is determined by the following equation:

$$K_{min3} = \sqrt{\frac{V_{max}^2 - \sqrt{V_{max}^4 - 4L_s^2 \sigma L_s^2 \frac{T_e^2}{K_t^2}}}{2L_s^2 i_{dse}^2}}.$$

6. The apparatus of claim 1, wherein the $K_{min\ 4}$ is determined by the following equation:

$$K_{min4} \geq 0.2.$$

7. The apparatus of claim 1, wherein the $K_{max}$ is determined by the following equation:

$$K_{max} = \sqrt{\frac{V_{max}^2 + \sqrt{V_{max}^4 - 4L_s^2 \sigma L_s^2 \frac{T_e^2}{K_t^2}}}{2L_s^2 i_{dse}^2}}.$$

* * * * *